US011923626B2

(12) United States Patent
Chang et al.

(10) Patent No.: US 11,923,626 B2
(45) Date of Patent: Mar. 5, 2024

(54) ANTENNA APPARATUS AND MOBILE TERMINAL

(71) Applicant: Huawei Technologies Co., Ltd., Shenzhen (CN)

(72) Inventors: Le Chang, Shenzhen (CN); Yafang Yu, Shenzhen (CN); Kunpeng Wei, Shenzhen (CN); Dawei Zhou, Shenzhen (CN); Dong Yu, Shanghai (CN); Hanyang Wang, Reading (GB)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 264 days.

(21) Appl. No.: 17/610,972

(22) PCT Filed: Mar. 5, 2020

(86) PCT No.: PCT/CN2020/078006
§ 371 (c)(1),
(2) Date: Nov. 12, 2021

(87) PCT Pub. No.: WO2020/228399
PCT Pub. Date: Nov. 19, 2020

(65) Prior Publication Data
US 2022/0239004 A1 Jul. 28, 2022

(30) Foreign Application Priority Data
May 13, 2019 (CN) ......................... 201910401967.3

(51) Int. Cl.
*H01Q 9/40* (2006.01)
*H01Q 1/48* (2006.01)
(Continued)

(52) U.S. Cl.
CPC ................. *H01Q 9/40* (2013.01); *H01Q 1/48* (2013.01); *H01Q 9/20* (2013.01); *H01Q 13/10* (2013.01)

(58) Field of Classification Search
CPC .. H01Q 9/40; H01Q 1/48; H01Q 9/20; H01Q 13/10
(Continued)

(56) References Cited

U.S. PATENT DOCUMENTS 8,085,202 B2 * 12/2011 Ayatollahi ............. H01Q 1/521 343/702
8,599,084 B2 * 12/2013 Wong ....................... H01Q 5/40 343/749
(Continued)

FOREIGN PATENT DOCUMENTS

CN 102610908 A 7/2012
CN 202633501 U 12/2012
(Continued)

OTHER PUBLICATIONS

Eldek, A. A., et al., "Rectangular Slot Antenna With Patch Stub for Ultra Wideband Applications and Phased Array Systems," Progress in Electromagnetics Research, vol. 53, Feb. 5, 2005, pp. 227-237, XP055621121.
(Continued)

*Primary Examiner* — Hai V Tran
(74) *Attorney, Agent, or Firm* — Conley Rose, P.C.

(57) ABSTRACT

An antenna apparatus includes a grounding plate, a monopole, a first feeding component, and a second feeding component. A slot on the grounding plate includes a first slot and a second slot that interpenetrate each other, the second slot extends from the first slot to an edge of the grounding plate. The monopole includes a first stub and a second stub extending from the first stub to the second slot, the second
(Continued)

stub and the second slot form a feeding structure. The first feeding component is electrically coupled to the grounding plate to feed the feeding structure to excite a first radiation mode of the antenna apparatus. The second feeding component is electrically coupled to the second stub to feed the feeding structure to excite a second radiation mode of the antenna apparatus. Polarizations in the two radiation modes are orthogonal.

20 Claims, 6 Drawing Sheets

(51) Int. Cl.
*H01Q 9/20* (2006.01)
*H01Q 13/10* (2006.01)
(58) Field of Classification Search
USPC .......................................................... 343/771
See application file for complete search history.

(56) References Cited

U.S. PATENT DOCUMENTS

| | | | | |
|---|---|---|---|---|
| 8,957,814 | B2 * | 2/2015 | Eom | H01Q 1/243 343/702 |
| 9,041,606 | B2 * | 5/2015 | Faraone | H01Q 1/243 343/866 |
| 9,728,858 | B2 * | 8/2017 | Zhu | H01Q 1/243 |
| 9,786,980 | B2 * | 10/2017 | Ku | H01Q 21/28 |
| 2004/0174314 | A1 | 9/2004 | Brown | |
| 2004/0183733 | A1 * | 9/2004 | Aoyama | H01Q 1/38 343/702 |
| 2010/0238079 | A1 | 9/2010 | Ayatollahi et al. | |
| 2011/0032157 | A1 | 2/2011 | Suh et al. | |
| 2013/0120201 | A1 * | 5/2013 | Park | H01Q 1/48 343/749 |
| 2013/0241796 | A1 * | 9/2013 | Nagumo | H04B 1/0458 343/861 |
| 2016/0181694 | A1 | 6/2016 | Chen et al. | |
| 2016/0256459 | A1 | 9/2016 | Man et al. | |
| 2019/0081411 | A1 | 3/2019 | Isom et al. | |

FOREIGN PATENT DOCUMENTS

| | | | |
|---|---|---|---|
| CN | 103296424 | A | 9/2013 |
| CN | 104300211 | A | 1/2015 |
| CN | 104505592 | A | 4/2015 |
| CN | 105552553 | A | 5/2016 |
| CN | 106129609 | A | 11/2016 |
| CN | 205846242 | U | 12/2016 |
| CN | 106299727 | A | 1/2017 |
| CN | 106469849 | A | 3/2017 |
| CN | 106785370 | A | 5/2017 |
| CN | 106848602 | A | 6/2017 |
| CN | 107112639 | A | 8/2017 |
| CN | 107204516 | A | 9/2017 |
| CN | 208189774 | U | 12/2018 |
| EP | 2819245 | A1 | 12/2014 |
| EP | 2930786 | A2 | 10/2015 |
| KR | 101727859 | B1 | 5/2017 |
| TW | I538309 | B | 6/2016 |

OTHER PUBLICATIONS

Yan, K., et al., "Eight-Antenna Array in the 5G Smartphone for the Dual-Band MIMO System," IEEE International Symposium on Antennas and Propagation and USNC/URSI National Radio Science Meeting, IEEE, Jul. 8, 2018, pp. 41-42, XP033496262.

* cited by examiner

ANTENNA APPARATUS AND MOBILE TERMINAL

CROSS-REFERENCE TO RELATED APPLICATIONS

This is a U.S. National Stage of International Patent Application No. PCT/CN2020/078006 filed on Mar. 5, 2020, which claims priority to Chinese Patent Application No. 201910401967.3 filed on May 13, 2019. Both of the aforementioned applications are hereby incorporated by reference in their entireties.

TECHNICAL FIELD

The present invention relates to the field of antenna technologies, and in particular, to an antenna apparatus used in a terminal.

BACKGROUND

With development of mobile communications technologies, a multi-input multi-output (multi input multi output, MIMO) antenna technology, such as a high-fidelity wireless multi-input multi-output (wireless fidelity MIMO, Wi-Fi MIMO) antenna, is increasingly widely used on a terminal, a quantity of antennas is multiplied, and increasingly more frequency bands are covered. Recently, the terminal tends to be designed with a higher screen-to-body ratio, more multimedia components, and a larger battery capacity. These designs cause intense compression of antenna space. How to arrange a plurality of antennas in limited design space is a very challenging problem. In addition, an industry design (industry design, ID) such as a metal ID or a full-screen ID of a terminal product also needs to be considered in antenna arrangement. This further increases an antenna arrangement difficulty.

SUMMARY

A technical problem to be resolved in embodiments of this disclosure is to provide an antenna apparatus that has an advantage of a compact structure, so that a plurality of antennas can be arranged in limited design space, and can be flexibly installed in a mobile terminal.

According to a first aspect, an embodiment of this disclosure provides an antenna apparatus, including a grounding plate, a monopole, a first feeding unit, and a second feeding unit. Specifically, the grounding plate may be a metal sheet structure, or may be a metal layer disposed on a dielectric board. The grounding plate is electrically connected to ground on a mainboard in a mobile terminal. The monopole may be a metal strip structure, or may be a microstrip structure disposed on the dielectric board. A slot is disposed on the grounding plate, the slot includes a first slot and a second slot that interpenetrate each other, and the second slot extends from the first slot to an edge of the grounding plate. In other words, the slot on the grounding plate forms an opening at an edge position of the grounding plate, so that the monopole extends into the slot through the opening. The monopole includes a first stub and a second stub. The second stub extends from the first stub into the second slot, in other words, the second stub extends from an opening position of the slot into the slot. The second stub extends to a position of the second slot, and the second stub is insulated from the grounding plate by using a gap, in other words, the second stub is not in contact with an inner wall of the slot. Specifically, the second stub is at a central position in the second slot. The second stub and the second slot form a feeding structure. The first feeding unit is electrically connected to the grounding plate and performs feeding as the feeding structure, to excite a first radiation mode of the antenna apparatus, where the first slot and the grounding plate are used as radiators in the first radiation mode. The second feeding unit is electrically connected to the second stub and performs feeding as the feeding structure, to excite a second radiation mode of the antenna apparatus, where the second stub and the grounding plate are used as radiators in the second radiation mode. A polarization direction in the first radiation mode is orthogonal to a polarization direction in the second radiation mode.

According to the antenna apparatus provided in this embodiment of this disclosure, two radiation modes of the antenna apparatus can be implemented by using a feeding structure formed after the monopole is coupled with the grounding plate. In this disclosure, the grounding plate is used as a main radiator, so that the antenna apparatus has balanced high performance, in other words, radiation performance is stable and of high quality, and a dual-antenna effect is implemented by using a simple and compact structure. In the two radiation modes, polarization directions of the antenna apparatus are orthogonal, so that the antenna apparatus has high isolation.

In an implementation, the first feeding unit excites an in-phase current loop around the first slot, and the in-phase current loop excites currents on the grounding plate in a first direction, to form the first radiation mode.

In the first radiation mode, the first slot on the grounding plate may be considered as two opening-to-opening open-circuit slots. Each open circuit works in a quarter-wave mode, and phases in the two quarter-wave modes are opposite to each other. Specifically, the first slot extends in the first direction. In the first direction, from one end to the other end of the first slot, an electric field changes from null (that is, a position on the grounding plate, where the position may be considered as a short-circuit point) to a maximum value (that is, a position at which the second slot intersects with the first slot, where in an implementation, a start point of the second slot is located at a central position in the first slot); and after the electric field passes through the second slot, a direction of the electric field is reversed, and the electric field changes from a reverse maximum value to null. In this way, currents surround the first slot to form a loop of in-phase currents in a same direction. The in-phase currents may excite the currents on the grounding plate in the first direction, so that the grounding plate becomes a main radiator, and a polarization direction is the first direction.

In an implementation, the second feeding unit excites generation of currents on the monopole and the grounding plate, the currents on the monopole and the grounding plate include currents distributed in the first direction and currents distributed in a second direction, and the currents in the first direction are in mirrored distribution by using the second stub as an axis of symmetry, in other words, the currents in the first direction have mutually reversed components and therefore do not form effective radiation, and only the currents distributed in the second direction contribute to radiation, to form the second radiation mode. The first direction is perpendicular to the second direction.

The second radiation mode is a monopole mode. In an implementation, the monopole and the grounding plate are distributed in an axisymmetric structure by using the second stub as a central axis, and the second stub is a strip structure. The currents in the first direction have mutually reversed components that offset each other. Therefore, in the second radiation mode, a current direction is only the second direction, the second stub and two edges of the grounding plate form radiation, and the two edges of the grounding plate are edges of the grounding plate that extend in a same direction as the second stub, are referred to as radiation edges, and are distributed on two sides of the second stub. For the monopole, currents on the second stub flow to the first stub from a tail end that is of the second stub and that is away from the first stub, and separately flow, on the first stub, to two ends of the first stub. Therefore, currents on the first stub that are distributed on the two sides of the second stub are in opposite directions, and can offset each other. For the grounding plate, currents that flow to the second slot are formed on an edge of the grounding plate. The edge of the grounding plate is an edge connected between the two radiation edges, in other words, an edge on which the second slot is located. Currents on the edge are all in the first direction, but are in opposite directions on two sides of the second slot, in other words, currents on one side flow leftward and currents on the other side flow rightward, and are mutually reversed currents. In this way, currents on the radiation edges of the grounding plate are in the second direction, and are in a same direction as the currents on the second stub. In this way, the grounding plate and the second stub form radiators, and the grounding plate is a main radiator.

In an implementation, an intersection between the second stub and the first stub is a connection part, and a first segment and a second segment of the first stub are symmetrically distributed on two sides of the connection part. In this embodiment, the monopole may be in a T-shape, a Y-shape, or another similar structure, and the first stub may be in a linear shape, or may be in an arc shape or a serpentine shape. This is not limited in this disclosure.

In an implementation, both the first segment and the second segment are linear and collinear, and a shape in which the first stub extends may affect an overall size of the antenna apparatus. A linear and collinear design helps save space.

In an implementation, the second stub is linear, and the second stub is perpendicular to the first segment. In other words, the monopole is T-shaped, has a simple structure, and is easy to manufacture.

Certainly, a shape of the monopole in the antenna apparatus in this disclosure may be extended. For example, in an implementation, the first stub includes a pair of bent segments, one of the bent segments is connected to an end that is of the first segment and that is away from the connection part, and the other bent segment is connected to an end that is of the second segment and that is away from the connection part. The pair of bent segments are symmetrically distributed on the two sides of the second stub.

In an implementation, the pair of bent segments and the second stub are located on same sides of the first segment and the second segment. In other words, the bent segments are located in space between the grounding plate and both the first segment and the second segment. It is clear that this structure helps save space.

In an implementation, a part that is of the second stub and that extends into the second slot and the grounding plate on an edge of the second slot jointly form a CPW (Coplanar Waveguide, coplanar waveguide) feeding structure.

In an implementation, in the first radiation mode, electric field distribution of the CPW feeding structure is a differential mode, and in the second radiation mode, electric field distribution of the CPW feeding structure is a common mode. In the two radiation modes, electric field distribution of the CPW feeding structure is opposite. In this disclosure, the differential mode of the CPW feeding structure is used to excite the first radiation mode (also referred to as an in-phase current loop mode) of the antenna apparatus. In this disclosure, the common mode of the CPW feeding structure is used to excite the second radiation mode (also referred to as a monopole mode) of the antenna apparatus.

Specifically, the antenna apparatus provided in this disclosure may be an intra-band dual-antenna pair with balanced high performance and high isolation. Optionally, the antenna apparatus may be specifically a Sub-6G dual-antenna pair, and a working frequency of the antenna apparatus is 3.4 GHz to 3.6 GHz, in other words, the same frequency band is a Sub-6G frequency band. Optionally, the antenna apparatus may be specifically an intra-band dual-Wi-Fi antenna pair such as a dual-Wi-Fi antenna pair on a 2.4 GHz frequency band, in other words, the same frequency band is a Wi-Fi frequency band such as a 2.4 GHz Wi-Fi frequency band. This constitutes no limitation. The antenna apparatus may alternatively be an intra-band dual-antenna pair on another frequency band.

In another implementation, the antenna apparatus may alternatively work on different frequency bands in the two modes. For example, the antenna apparatus works on a first frequency band in the first radiation mode, and works on a second frequency band in the second radiation mode. Optionally, the first frequency band may include a Wi-Fi frequency band, and the second frequency band may include a Wi-Fi frequency band and a GPS frequency band. For example, the antenna apparatus may excite slot to generate a 2.4 GHz Wi-Fi resonance (the first frequency band is a 2.4 GHz Wi-Fi frequency band), or may excite to generate two resonances: a GPS L1 resonance and a 2.4 GHz Wi-Fi resonance (the second frequency band includes a 2.4 GHz Wi-Fi frequency band and a GPS L1 frequency band). This constitutes no limitation. The first frequency band and the second frequency band may be other frequency bands.

In an implementation, the first feeding unit includes a first feeding point and a first feeder, an insulation slot is disposed on the grounding plate, the first feeding point is located in the insulation slot, and the first feeder crosses the CPW feeding structure, and is electrically connected between the first feeding point and the grounding plate.

In an implementation, the first feeding unit further includes a matching component, the matching component is electrically connected to the first feeder and is grounded, and the matching component is configured to adjust a resonance point and impedance matching that are of the antenna apparatus in the first radiation mode. By adjusting an antenna transmit coefficient, impedance, and the like, the matching component may also adjust a frequency band range covered by the antenna apparatus. In this implementation, electrically connecting the matching component to the first feeder is specifically: first connecting a 0.2 pF capacitor in parallel, and then connecting a 5.6 nH inductor in series.

In an implementation, the second feeding unit includes a second feeding point and a second feeder, and the second feeder is electrically connected between the second feeding point and the second stub to excite the second radiation mode. The second feeding unit also includes a matching component. The matching component is electrically connected to the second feeding point to affect the second feeding point, and is configured to adjust a resonance point and impedance matching that are of the antenna apparatus in the second radiation mode. For example, electrically connecting the matching component to the second feeding point is specifically: first connecting a 0.5 pF capacitor in parallel, and then connecting a 0.4 pF capacitor in series.

In an implementation, the first slot is an axisymmetric structure, and a symmetric central axis of the first slot is located on a center line that is of the second slot and that is in the second direction.

In an implementation, the first slot includes a first end and a second end that are disposed oppositely, a direction in which the first end extends to the second end is the first direction, the antenna apparatus works in a quarter-wave mode from the first end to a position of the second slot, the antenna apparatus works in the quarter-wave mode from the second slot to a position of the second end, an electric field at the first end and an electric field at the second end are zero, and an electric field value at the position of the second slot is the largest.

In an implementation, the monopole and the grounding plate are coplanar.

In an implementation, the antenna apparatus is a microstrip structure printed on a surface of a substrate. For example, a mobile terminal includes a mainboard and a side board. The side board is disposed at an edge position of the mainboard, and is disposed between the mainboard and a side frame of the mobile terminal. The side board may be perpendicular to the mainboard. In an implementation, the mainboard and the side board each may be an FR-4 dielectric plate with a thickness of 0.8 mm. Main ground is disposed on the mainboard, that is, a ground plane on the mainboard. The antenna apparatus is printed on the side board, and the grounding plate is electrically connected to the main ground on the mainboard. The grounding plate and the monopole are printed on an outer side of the side board. The outer side of the side board is a surface that is of the side board and that faces the side frame of the mobile terminal. A surface that is of the side board and that faces the inside of the mobile terminal and a surface of the mainboard is an inner side of the side board. The first feeding unit and the second feeding unit are disposed on the inner side of the side board. The side board includes a top part and a bottom part. The bottom part is an end that is of the side board and that is connected to the mainboard, and the top part is an end that is of the side board and that is away from the mainboard. In an implementation, the monopole is disposed on the top part of the side board, and the first slot in the slot is located on the bottom part of the side board.

According to a second aspect, an embodiment of this disclosure provides a mobile terminal, including a side frame connected between a display screen and a rear cover. A mainboard is disposed in the mobile terminal. An edge of the mainboard is disposed near the side frame, the mobile terminal further includes the antenna apparatus in any one of the foregoing implementations, and the antenna apparatus is located between the mainboard and the side frame.

BRIEF DESCRIPTION OF DRAWINGS

To describe the technical solutions in the embodiments of the present invention or in the background more clearly, the following briefly describes the accompanying drawings required for describing the embodiments of the present invention or the background.

DESCRIPTION OF EMBODIMENTS

The following describes the embodiments of the present invention with reference to the accompanying drawings in the embodiments of the present invention.

The technical solutions provided in this disclosure are applicable to a terminal that uses one or more of the following MIMO communications technologies: a long term evolution (long term evolution, LTE) communications technology, a Wi-Fi communications technology, a 5G communications technology, a Sub-6G communications technology, another MIMO communications technology in the future, and the like. In this disclosure, the terminal may be an electronic device such as a mobile phone, a tablet computer, or a personal digital assistant (personal digital assistant, PDA).

Figure 1:
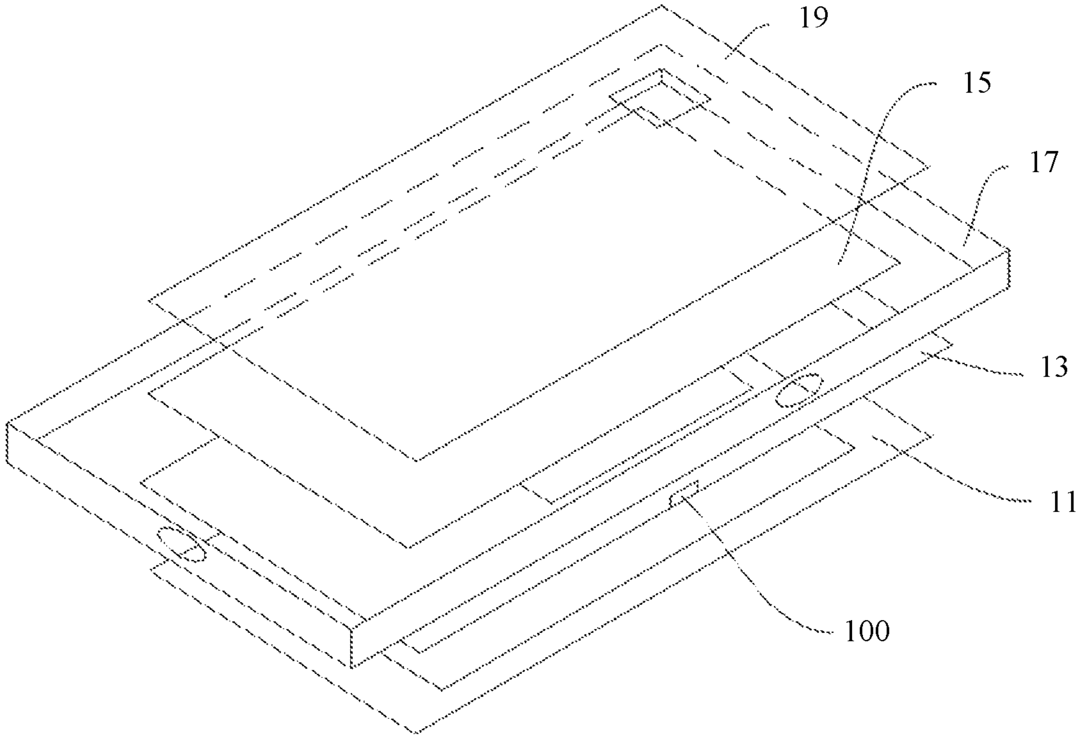
FIG. 1 is a diagram of an disclosure environment of an antenna apparatus according to an implementation of this disclosure.

FIG. 1 shows an example of an internal environment of a mobile terminal on which an antenna design solution provided in this disclosure is based. As shown in FIG. 1, the mobile terminal may include a display screen 11, a printed circuit board PCB 13, a PCB grounding plate 15, a side frame 17, and a rear cover 19. The display screen 11, the printed circuit board PCB 13, the PCB grounding plate 15, and the rear cover 19 may be separately disposed at different layers, and these layers may be parallel to each other. A plane on which the layers are located may be referred to as an X-Y plane, and a direction perpendicular to the X-Y plane is a Z direction. In other words, the display screen 11, the printed circuit board PCB 13, the PCB grounding plate 15, and the rear cover 17 may be distributed at different layers in the Z direction.

The printed circuit board PCB 13 may be an FR-4 dielectric board, or may be a Rogers (Rogers) dielectric board, or may be a dielectric board mixing Rogers and FR-4, or the like. Herein, FR-4 is a grade designation for a flame-retardant material, and the Rogers dielectric board is a high-frequency board.

The rear cover 19 may be a rear cover made of an insulating material, for example, a glass rear cover or a plastic rear cover. The rear cover 19 may alternatively be a metal rear cover. If the mobile terminal shown in FIG. 1 is a terminal of a full-metal ID, the rear cover 19 is a metal rear cover.

The PCB grounding plate 15 is grounded, and may be disposed between the printed circuit board PCB 13 and the rear cover 19. The PCB grounding plate 15 may also be referred to as a PCB baseboard. Specifically, the PCB grounding plate 15 may be a metal layer etched on a surface of the PCB 13, and the metal layer may also be connected to a metal frame (not shown) by using a series of metal spring plates, to be integrated with the metal frame. The PCB grounding plate 15 may be configured to ground an electronic component carried on the printed circuit board PCB 13. Specifically, the electronic component carried on the printed circuit board PCB 13 may be grounded through wiring to the PCB grounding plate 15, to prevent a user from getting an electric shock or prevent a device from being damaged.

The side frame 17 may be disposed on an edge of the printed circuit board PCB 13 and an edge of the PCB grounding plate 15, and may cover the printed circuit board PCB 13 and the PCB grounding plate 15 between the rear cover 19 and the display screen 11 from a side edge, to be dustproof and waterproof. In an implementation, the side frame 17 may include four metal edges, and the four metal edges may be disposed around the display screen 11, the printed circuit board PCB 13, the PCB grounding plate 15, and the rear cover 19. In another implementation, the side frame 17 may include only two metal edges, and the two metal edges may be disposed on two sides of the display screen 11, the printed circuit board PCB 13, the PCB grounding plate 15, and the rear cover 19 in a Y direction. The two implementations constitute no limitation. The side frame 17 may alternatively present another design style, such as a side frame 17 with a single metal edge. This is not limited in this disclosure.

Figure 2:
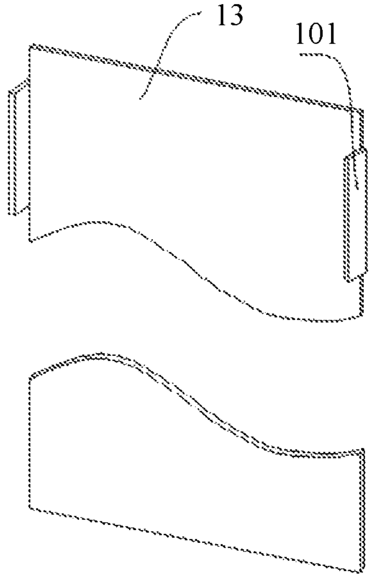
FIG. 2 is a schematic diagram of a positional relationship between a printed circuit board PCB and a side board in a mobile terminal in FIG. 1.

The printed circuit board PCB 13 may be a mainboard in the mobile terminal. An antenna apparatus 100 provided in this disclosure is disposed at a position between the printed circuit board PCB 13 and the side frame 17. In other words, the antenna apparatus 100 may be disposed at an edge position of the printed circuit board PCB 13. As shown in FIG. 2, a side board 101 is disposed in the mobile terminal, the side board 101 is located on an edge of the printed circuit board PCB 13, the side board 101 may be perpendicular to the printed circuit board PCB 13, and the antenna apparatus 100 is disposed on the side board 101, in other words, the side board 101 is a board for bearing the antenna apparatus 100. In this disclosure, the antenna apparatus 100 may be disposed at positions on left and right sides of the mobile terminal, so that small space is occupied, and working of another antenna apparatus is not affected. The antenna apparatus 100 may be disposed on both the left side and the right side of the mobile terminal. In an implementation, the antenna apparatus 100 may be disposed at a position close to a top part of the mobile terminal, to avoid a handheld area (when holding the mobile terminal, a user usually tends to hold an area that is in a middle part and near a bottom part of the mobile terminal, and rarely holds a top area). In this way, performance stability of the antenna apparatus can be ensured. In an implementation, the mainboard and the side board each may be an FR-4 dielectric board with a thickness of 0.8 mm, and main ground is disposed on the mainboard, that is, a ground plane (namely, the foregoing PCB grounding plate 15) on the mainboard.

Figure 3:
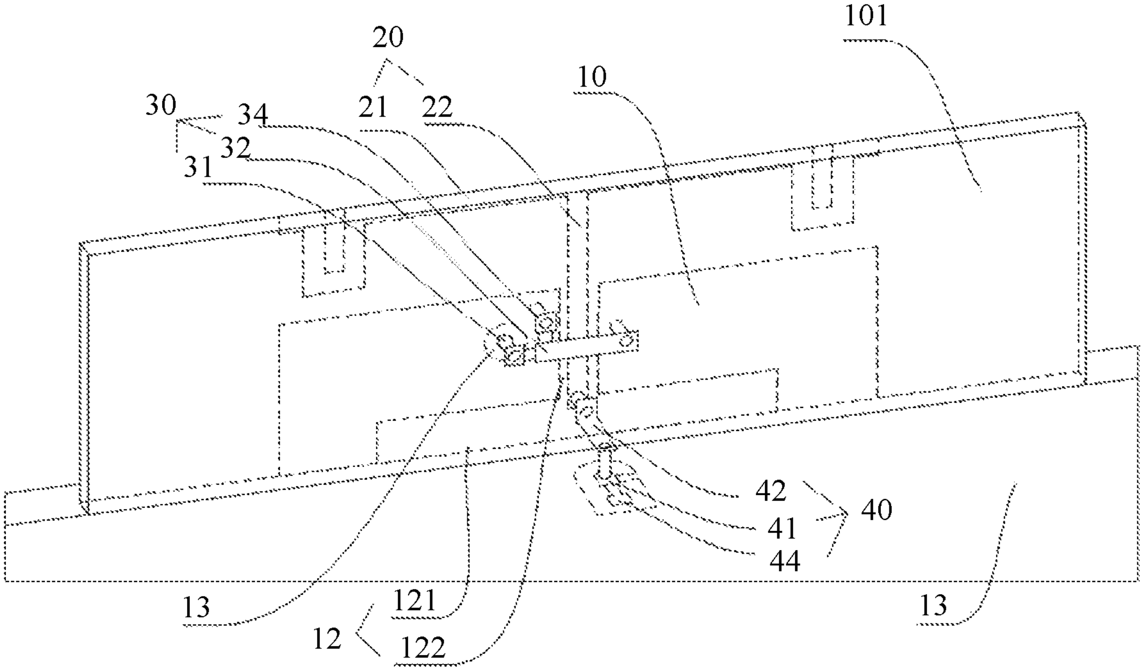
FIG. 3 is a schematic diagram of an architecture of an antenna apparatus according to an implementation of this disclosure.
Figure 4:
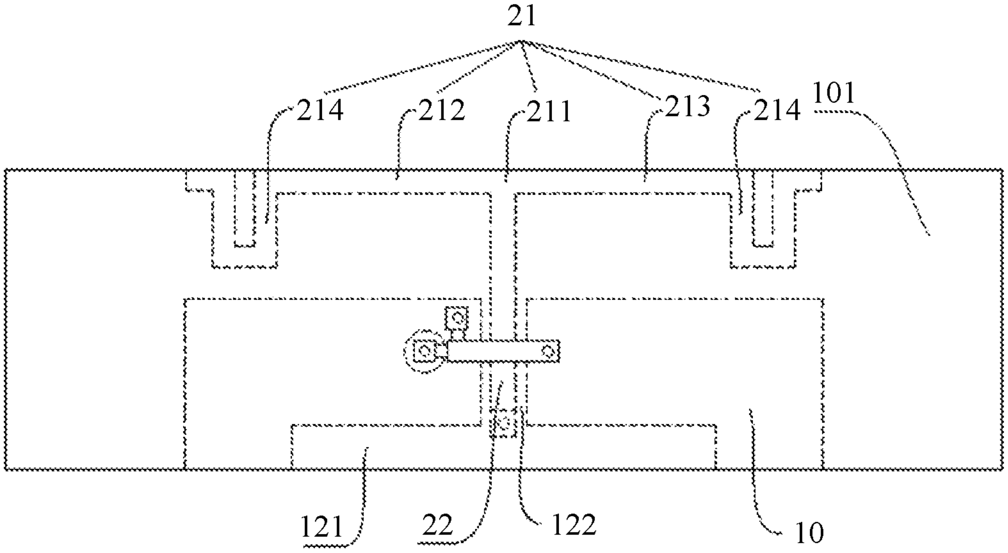
FIG. 4 is a schematic planar diagram of the antenna apparatus shown in FIG. 3.
Figure 6:
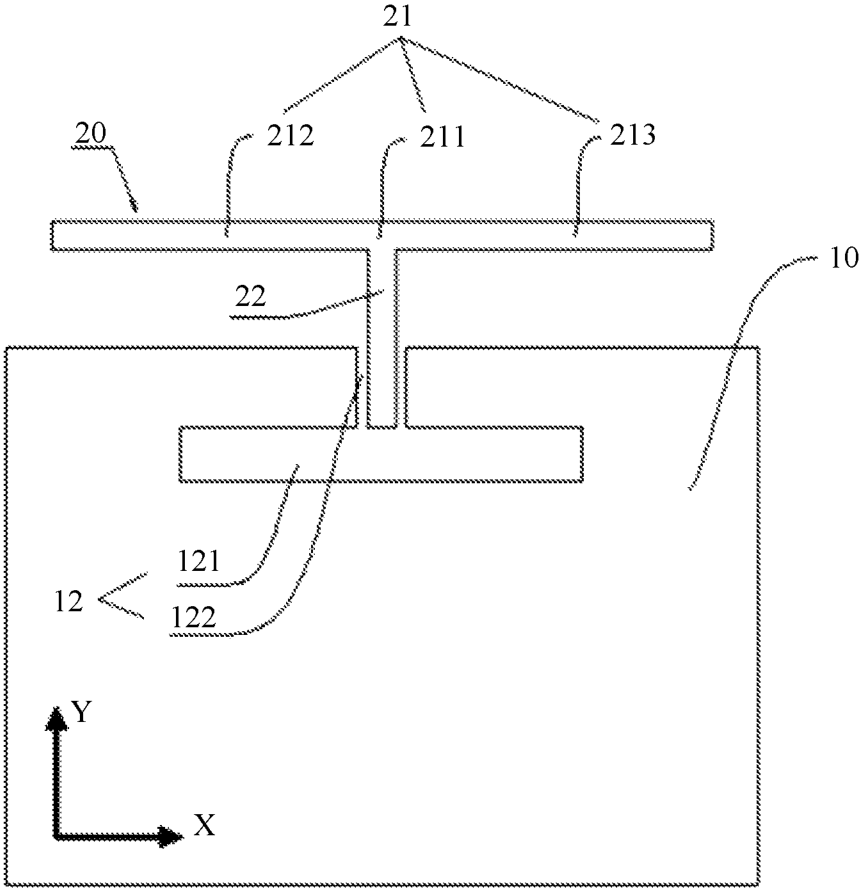
FIG. 6 is a schematic planar diagram of an antenna apparatus according to an implementation of this disclosure.

Referring to FIG. 3, FIG. 4, and FIG. 6, the antenna apparatus 100 includes a grounding plate 10, a monopole 20, a first feeding unit 30, and a second feeding unit 40. In FIG. 3, reference numerals 10 and 20 indicate areas in pointed dotted boxes. Specifically, the grounding plate 10 may be a metal sheet structure, or may be a metal layer disposed on a dielectric board. As shown in FIG. 3, the grounding plate 10 is printed on a surface of the side board 101. The grounding plate 10 is electrically connected to ground on the mainboard (namely, the printed circuit board PCB 13) of the mobile terminal. The monopole 20 may be a metal strip structure, or may be a microstrip structure disposed on the dielectric board. As shown in FIG. 3, the monopole 20 is printed on the surface of the side board 101 and is coplanar with the grounding plate 10. In the embodiment shown in FIG. 3, the first feeding unit 30 and the second feeding unit 40 are printed on the surface of the side board 101, and the surface on which the first feeding unit 30 and the second feeding unit 40 are located is disposed oppositely to a surface on which the grounding plate 10 and the monopole 20 are located.

A slot 12 is disposed on the grounding plate 10, the slot 12 includes a first slot 121 and a second slot 122 that interpenetrate each other, and the second slot 122 extends from the first slot 121 to an edge of the grounding plate 10. In other words, the slot 12 on the grounding plate 10 forms an opening at an edge position of the grounding plate 10, so that the monopole 20 extends into the slot 12 through the opening. The monopole 20 includes a first stub 21 and a second stub 22. The second stub 22 extends from the first stub 21 into the second slot 122, in other words, the second stub 22 extends from an opening position of the slot 12 into the slot 12. The second stub 22 extends to a position of the second slot 122. Specifically, in an implementation, the second stub 22 extends to an intersection between the second slot 122 and the first slot 121. In another implementation, the second stub 22 may alternatively extend into the first slot 121, or an end point to which the second stub 22 extends is located inside the second slot 122 or at a middle position of the second slot 122. The second stub 22 is insulated from the grounding plate 10 by using a gap, in other words, the second stub 22 is not in contact with an inner wall of the slot 12. Specifically, the second stub 22 is at a central position in the second slot 122. The second stub 22 and the second slot 122 form a feeding structure. The first feeding unit 30 is electrically connected to the grounding plate 10 and is configured to feed the feeding structure, to excite a first radiation mode of the antenna apparatus, where the grounding plate 10 and the second slot 122 are used as radiators in the first radiation mode. The second feeding unit 40 is electrically connected to the second stub 22 and performs feeding as the feeding structure, to excite a second radiation mode of the antenna apparatus, where the second stub 22 and the grounding plate 10 are used as radiators in the second radiation mode. A polarization direction in the first radiation mode is orthogonal to a polarization direction in the second radiation mode.

According to the antenna apparatus provided in this embodiment of this disclosure, two radiation modes of the antenna apparatus can be implemented by using a feeding structure formed after the monopole 20 is coupled with the grounding plate 10. In this disclosure, the grounding plate 10 is used as a main radiator, so that the antenna apparatus has balanced high performance, in other words, radiation performance is stable and of high quality, and a dual-antenna effect is implemented by using a simple and compact structure. In the two radiation modes, polarization directions of the antenna apparatus are orthogonal, so that the antenna apparatus has high isolation.

Figure 7:
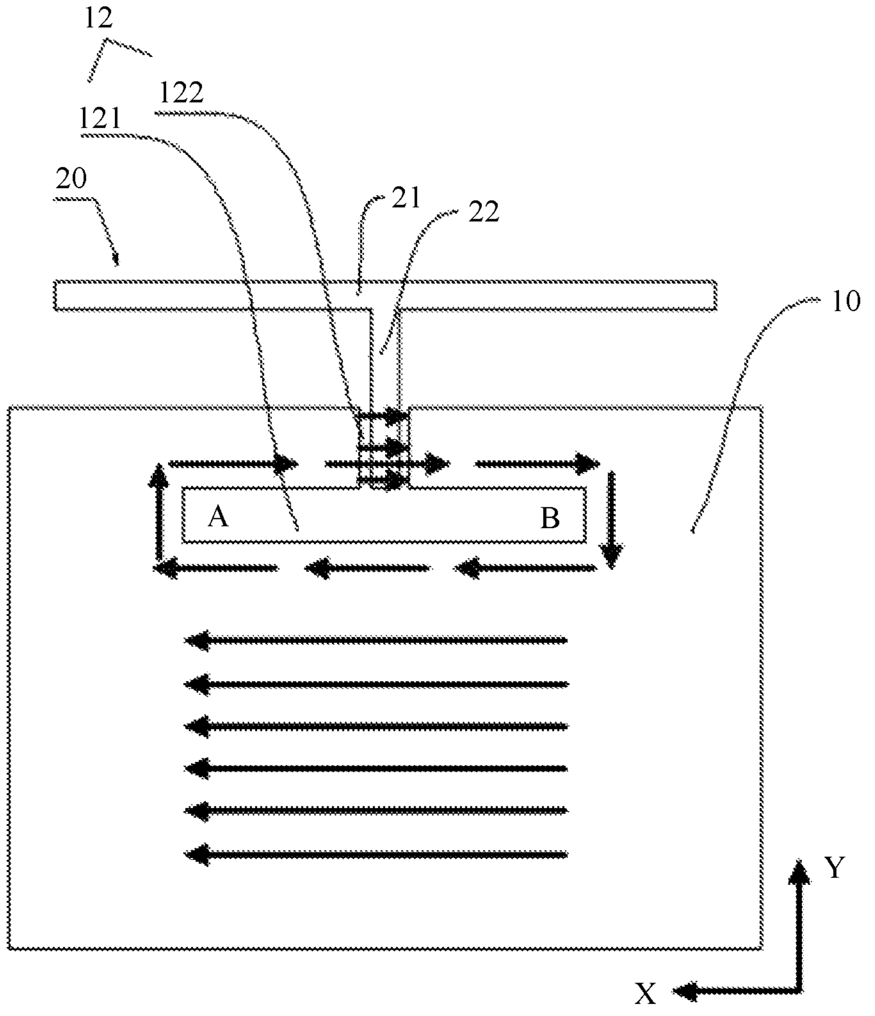
FIG. 7 is a schematic diagram of a first radiation mode of an antenna apparatus according to an implementation of this disclosure.

As shown in FIG. 7, in an implementation, the first feeding unit 30 excites an in-phase current loop around the first slot 121, and the in-phase current loop excites currents on the grounding plate 10 in a first direction, to form the first radiation mode. The first direction is an X direction in FIG. 7.

In the first radiation mode, the first slot 121 on the grounding plate 10 may be considered as two opening-to-opening open-circuit slots. Each open circuit works in a quarter-wave mode, and phases in the two quarter-wave modes are opposite. Specifically, the first slot 121 extends in the first direction. In the first direction, from one end A to the other end B of the first slot 121, an electric field changes from null (that is, a position on the grounding plate 10, where the position may be considered as a short-circuit point) to a maximum value (that is, a position at which the second slot 122 intersects with the first slot 121, where in an implementation, a start point of the second slot 122 is located at a central position in the first slot 121); and after the electric field passes through the second slot 122, a direction of the electric field is reversed, and the electric field changes from a reverse maximum value to null. In this way, currents surround the first slot 121 to form a loop of in-phase currents in a same direction. In the embodiment shown in FIG. 7, the direction of the in-phase current loop is a current in a clockwise direction around the first slot 121. The in-phase currents may excite the currents on the grounding plate 10 in the first direction (in the embodiment shown in FIG. 7, a current direction on the grounding plate 10 is horizontally leftward), so that the grounding plate 10 becomes a main radiator, and a polarization direction is the first direction.

Figure 8:
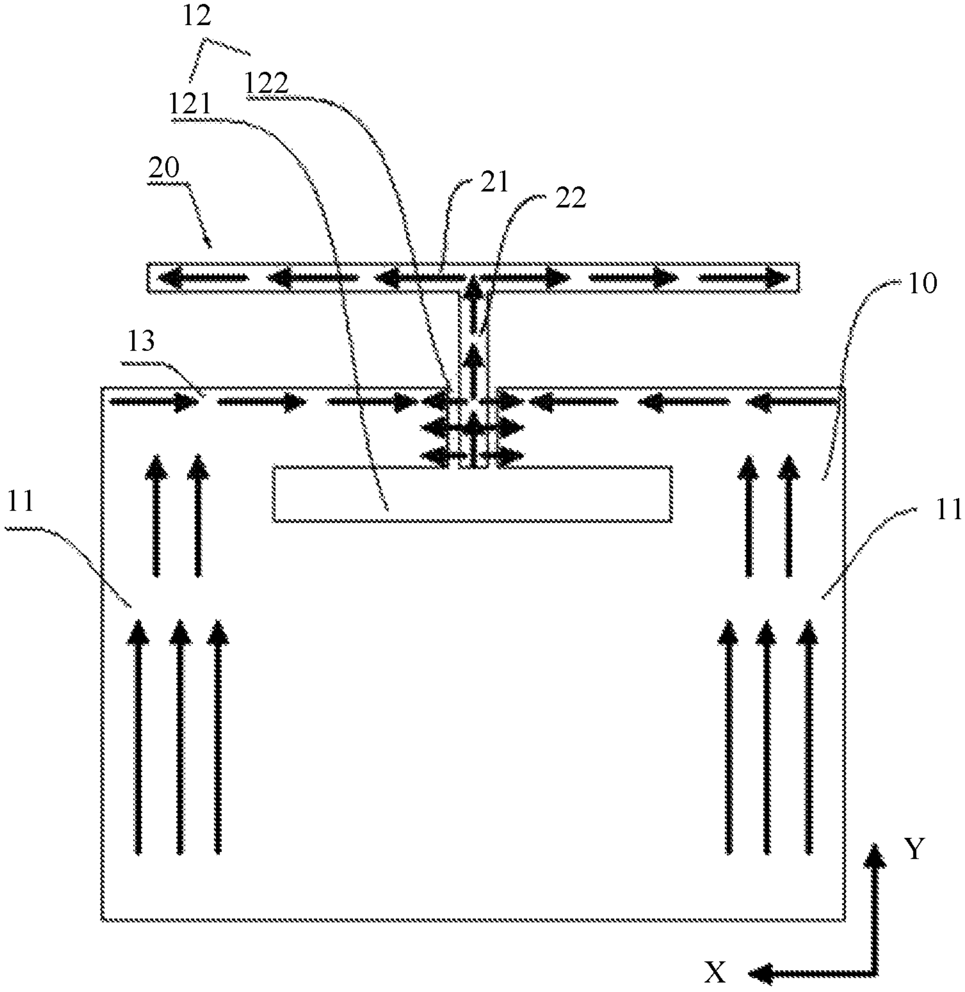
FIG. 8 is a schematic diagram of a second radiation mode of an antenna apparatus according to an implementation of this disclosure.

As shown in FIG. 8, in an implementation, the second feeding unit 40 excites generation of currents on the monopole 20 and the grounding plate 10. Currents on the first stub 21 are distributed in the first direction, and currents on the second stub 22 are distributed in a second direction. For the monopole 20, the currents flow from a bottom part of the second stub 22 to the first stub 21 in the second direction (that is, the Y direction), and the currents separately flow leftward and rightward on the first stub 21. In this way, the currents on the first stub 21 that are located on two sides of the second stub 22 are in opposite directions, in other words, mutually reversed components of the currents on the first stub 21 are formed. The currents on the grounding plate 10 include currents distributed in the first direction and currents distributed in the second direction. As shown in FIG. 8, the currents on the grounding plate 10 flow from a bottom part of the grounding plate 10 to a top part of the grounding plate 10 in the second direction (the Y direction). At the top part of the grounding plate 10, the currents all flow to the second slot 122. In this way, mutually reversed components of the currents are formed at the top part of the grounding plate 10. The currents on the first stub 21 and the currents on the grounding plate 10 that are distributed in the first direction have mutually reversed components, and the currents on the grounding plate 10 in the second direction are in a same direction as the currents on the second stub 22. Therefore, this mode is the second radiation mode, and the first direction is perpendicular to the second direction. In other words, the currents on the monopole 20 and the grounding plate 10 include the currents distributed in the first direction and the currents distributed in the second direction, and the currents in the first direction are in mirrored distribution by using the second stub 22 as an axis of symmetry, in other words, the currents in the first direction have mutually reversed components and therefore do not form effective radiation, and only the currents distributed in the second direction contribute to radiation, to form the second radiation mode.

The second radiation mode is a monopole 20 mode. In an implementation, the monopole 20 and the grounding plate 10 are distributed in an axisymmetric structure by using the second stub 22 as a central axis, and the second stub 22 is a strip structure. The currents in the first direction have mutually reversed components that offset each other. Therefore, in the second radiation mode, a current direction is only the second direction (that is, the Y direction), the second stub 22 and two edges 11 of the grounding plate 10 form radiation, and the two edges 11 of the grounding plate 10 are edges of the grounding plate 10 that extend in a same direction as the second stub 22, are referred to as radiation edges 11, and are distributed on the two sides of the second stub 22. For the monopole 20, the currents on the second stub 22 flow to the first stub 21 from a tail end that is of the second stub 22 that is away from the first stub 21, and separately flow, on the first stub 21, to two ends of the first stub 21. Therefore, the currents on the first stub 21 that are distributed on the two sides of the second stub 22 are in opposite directions, and can offset each other. For the grounding plate 10, currents that flow to the second slot 122 are formed on an edge 13 of the grounding plate 10. The edge 13 of the grounding plate 10 is an edge connected between the two radiation edges 11, in other words, an edge on which the second slot 122 is located. Currents on the edge are all in the first direction, but are in opposite directions on the two sides of the second slot 122, in other words, currents on one side flow leftward and currents on the other side flow rightward, and are mutually reversed currents. In this way, currents on the radiation edges 11 of the grounding plate 10 are in the second direction, and are in a same direction as the currents on the second stub 22. In this way, the grounding plate 10 and the second stub 22 form radiators, and the grounding plate 10 is a main radiator.

Figure 5:
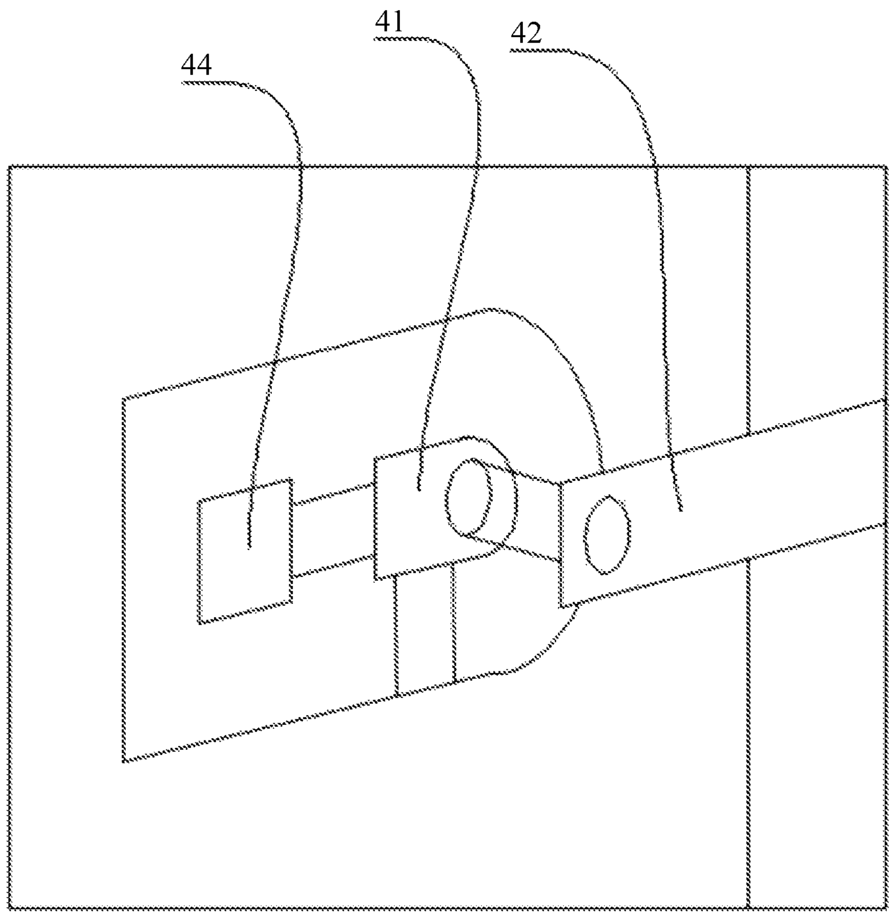
FIG. 5 is a schematic diagram of enlarging a second feeding unit of the antenna apparatus in FIG. 3.

In an implementation, as shown in FIG. 3 to FIG. 5, the second stub 22 includes a connection part 211, a first segment 212, and a second segment 213. An intersection between the second stub 22 and the first stub 21 is the connection part 211, and the first segment 212 and the second segment 213 of the first stub 21 are symmetrically distributed on two sides of the connection part 211. In this embodiment, the monopole 20 may be in a T-shape, a Y-shape, or another similar structure, and the first stub 21 may be in a linear shape, or may be in an arc shape or a serpentine shape. This is not limited in this disclosure.

In an implementation, both the first segment 212 and the second segment 213 are linear and collinear, and a shape in which the first stub 21 extends may affect an overall size of the antenna apparatus. A linear and collinear design helps save space.

In an implementation, the second stub 22 is linear, and the second stub 22 is perpendicular to the first segment 212. In other words, the monopole 20 is T-shaped, has a simple structure, and is easy to manufacture.

Certainly, a shape of the monopole 20 in the antenna apparatus in this disclosure may be extended. For example, as shown in FIG. 3 and FIG. 4, in an implementation, the first stub 21 includes a pair of bent segments 214, one of the bent segments 214 is connected to an end that is of the first segment 212 and that is away from the connection part 211, and the other bent segment 214 is connected to an end that is of the second segment 213 and that is away from the connection part 211. The pair of bent segments 214 are symmetrically distributed on the two sides of the connection part 211 of the second stub 22.

In an implementation, the pair of bent segments 214 and the second stub 22 are located on same sides of the first segment 212 and the second segment 213. In other words, the bent segments 214 are located in space between the grounding plate 10 and both the first segment 212 and the second segment 213. It is clear that this structure helps save space.

In an implementation, a part that is of the second stub 22 and that extends into the second slot 122 and the grounding plate 10 on an edge of the second slot 122 jointly form a CPW (Coplanar Waveguide, coplanar waveguide) feeding structure.

In an implementation, in the first radiation mode, electric field distribution of the CPW feeding structure is a differential mode, and in the second radiation mode, electric field distribution of the CPW feeding structure is a common mode. In the two radiation modes, electric field distribution of the CPW feeding structure is opposite. In this disclosure, the differential mode of the CPW feeding structure is used to excite the first radiation mode (also referred to as an in-phase current loop mode) of the antenna apparatus. In this disclosure, the common mode of the CPW feeding structure is used to excite the second radiation mode (also referred to as a monopole mode) of the antenna apparatus.

Specifically, the antenna apparatus provided in this disclosure may be an intra-band dual-antenna pair with balanced high performance and high isolation. Optionally, the antenna apparatus may be specifically a Sub-6G dual-antenna pair, and a working frequency of the antenna apparatus is 3.4 GHz to 3.6 GHz, in other words, the same frequency band is a Sub-6G frequency band. Optionally, the antenna apparatus may be specifically an intra-band dual-Wi-Fi antenna pair such as a dual-Wi-Fi antenna pair on a 2.4 GHz frequency band, in other words, the same frequency band is a Wi-Fi frequency band such as a 2.4 GHz Wi-Fi frequency band. This constitutes no limitation. The antenna apparatus may alternatively be an intra-band dual-antenna pair on another frequency band.

In another implementation, the antenna apparatus may alternatively work on different frequency bands in the two modes. For example, the antenna apparatus works on a first frequency band in the first radiation mode, and works on a second frequency band in the second radiation mode. Optionally, the first frequency band may include a Wi-Fi frequency band, and the second frequency band may include a Wi-Fi frequency band and a GPS frequency band. For example, the antenna apparatus may excite generation of a 2.4 GHz Wi-Fi resonance (the first frequency band is a 2.4 GHz Wi-Fi frequency band), or may excite generation of two resonances: a GPS L1 resonance and a 2.4 GHz Wi-Fi resonance (the second frequency band includes a 2.4 GHz Wi-Fi frequency band and a GPS L1 frequency band). This constitutes no limitation. The first frequency band and the second frequency band may be other frequency bands.

As shown in FIG. 3 and FIG. 4, in an implementation, the first feeding unit 30 includes a first feeding point 31 and a first feeder 32, an insulation slot 13 is disposed on the grounding plate 10, the first feeding point 31 is located in the insulation slot 13, and the first feeder 32 crosses the CPW feeding structure, and is electrically connected between the first feeding point 31 and the grounding plate 10.

In an implementation, the first feeding unit 30 further includes a matching component 34, the matching component 34 is electrically connected to the first feeder 32 and is grounded, and the matching component 34 is configured to adjust a resonance point and impedance matching that are of the antenna apparatus in the first radiation mode. By adjusting an antenna transmit coefficient, impedance, and the like, the matching component 34 may also adjust a frequency band range covered by the antenna apparatus. In this implementation, electrically connecting the matching component 34 to the first feeder 32 is specifically: first connecting a 0.2 pF capacitor in parallel, and then connecting a 5.6 nH inductor in series.

As shown in FIG. 3 and FIG. 5, in an implementation, the second feeding unit 40 includes a second feeding point 41 and a second feeder 42, and the second feeder 42 is electrically connected between the second feeding point 41 and the second stub 22 to excite the second radiation mode. Specifically, the second feeding point 41 may be disposed on the mainboard of the mobile terminal, or the second feeder 42 may be a microstrip printed on a surface of the mainboard. The second feeding unit 40 also includes a matching component 44. The matching component 44 is electrically connected to the second feeding point 41 to affect the second feeding point 41, and is configured to adjust a resonance point and impedance matching that are of the antenna apparatus in the second radiation mode. For example, electrically connecting the matching component 44 to the second feeding point 41 is specifically: first connecting a 0.5 pF capacitor in parallel, and then connecting a 0.4 pF capacitor in series. In the embodiment shown in FIG. 5, the second feeding point 41 and the matching component 44 are disposed on a bottom surface of the mainboard in the mobile terminal, the second feeder 42 is printed on a top surface of the mainboard, and the second feeder 42 and the second feeding point 41 may be electrically connected by using a metallized through-hole.

In an implementation, the first slot 121 is an axisymmetric structure, and a symmetric central axis of the first slot 121 is located on a center line that is of the second slot 122 and that is in the second direction.

In an implementation, as shown in FIG. 7, the first slot 121 includes a first end A and a second end B that are disposed oppositely, a direction in which the first end A extends to the second end B is the first direction, the antenna apparatus works in a quarter-wave mode from the first end A to a position of the second slot 122, the antenna apparatus works in the quarter-wave mode from the second slot 122 to a position of the second end B, an electric field at the first end A and an electric field at the second end B are zero, and an electric field value at the position of the second slot 122 is the largest.

In an implementation, the monopole 20 and the grounding plate 10 are coplanar.

In an implementation, the antenna apparatus is a microstrip structure printed on a surface of a substrate, and the grounding plate 10 is electrically connected to the main ground on the mainboard in the mobile terminal. The grounding plate 10 and the monopole 20 are printed on an outer side of the side board 101. The outer side of the side board 101 is a surface that is of the side board 101 and that faces the side frame 17 of the mobile terminal. A surface that is of the side board 101 and that faces the inside of the mobile terminal and the surface of the mainboard is an inner side of the side board 101. The first feeding unit 30 and the second feeding unit 40 are disposed on the inner side of the side board 101. The side board 101 includes a top part and a bottom part. The bottom part is an end that is of the side board 101 and that is connected to the mainboard, and the top part is an end that is of the side board 101 and that is away from the mainboard. In an implementation, the monopole 20 is disposed on the top part of the side board, and the first slot 121 in the slot 12 is located on the bottom part of the side board.

In this disclosure, a size of the mainboard in the mobile terminal is 155 mm×75 mm, and a height of the side board 101 (that is, a vertical distance between the bottom part and the top part of the side board) is 7 mm. A total size of the antenna apparatus in this disclosure is 15 mm×7 mm.

It can be learned through a simulation test (parasitic parameters and loss internal resistance that are of a lumped element are considered in simulation) that, in a working frequency range, for the in-phase current loop mode excited by the first feeding point, a reflection coefficient is less than −5.3 dB, impedance bandwidth of −6 dB is 7.6% (3.41 GHz to 3.68 GHz), total efficiency is between 48.0% and 60.3%, and average total efficiency is 55.8%; and for the monopole mode excited by the second feeding point, a reflection coefficient is less than −7.4 dB, impedance bandwidth of −6 dB is 7.1% (3.38 GHz to 3.63 GHz), total efficiency is between 52.1% and 63.0%, and average total efficiency is 59.1%. Therefore, two antennas in a dual-antenna pair have very balanced high performance. Because the modes are orthogonal, quite high isolation and a quite small envelope-related coefficient are obtained. On a working frequency band, the isolation is greater than −28 dB, and the envelope-related coefficient is less than 0.0015.

A camera and a terminal provided in the embodiments of this disclosure are described in detail above. The principle and embodiment of this disclosure are described herein through specific examples. The description about the embodiments of this disclosure is merely provided to help understand the method and core ideas of this disclosure. In addition, persons of ordinary skill in the art can make variations and modifications to this disclosure in terms of the specific embodiments and disclosure scopes according to the ideas of this disclosure. Therefore, the content of specification shall not be construed as a limitation to this disclosure.

What is claimed is:

1. An antenna apparatus comprising:
- a grounding plate comprising a first edge, wherein the grounding plate is configured to radiate in a first radiation mode and in a second radiation mode, and wherein a first polarization direction in the first radiation mode is orthogonal to a second polarization direction in the second radiation mode;
- a slot disposed on the grounding plate and comprising:
  - a first slot configured to radiate in the first radiation mode; and
  - a second slot configured to penetrate the first slot and to extend from the first slot to the first edge;
- a monopole comprising:
  - a first stub; and
  - a second stub configured to:
    - extend from the first stub to the second slot; and
    - radiate in the second radiation mode,
    - wherein the second stub and the second slot form a feeding structure;
- a first feeding component electrically coupled to the grounding plate and configured to feed the feeding structure to excite the first radiation mode; and
- a second feeding component electrically coupled to the second stub and configured to feed the feeding structure to excite the second radiation mode.

2. The antenna apparatus of claim 1, wherein the first feeding component is further configured to excite an in-phase current loop around the first slot, and wherein the in-phase current loop is configured to excite first currents on the grounding plate in a first direction to form the first radiation mode.

3. The antenna apparatus of claim 2, wherein the second feeding component is further configured to excite second currents on the monopole and the grounding plate, wherein the second currents comprise the first currents and third currents distributed in a second direction, and wherein the first currents on the grounding plate and the monopole in the first direction are in a mirrored distribution having the second stub as an axis of symmetry.

4. The antenna apparatus of claim 3, further comprising a connection part that is an intersection between the second stub and the first stub and comprising two sides, wherein the first stub comprises a first segment and a second segment that are symmetrically distributed on the two sides.

5. The antenna apparatus of claim 4, wherein both the first segment and the second segment are linear and collinear.

6. The antenna apparatus of claim 5, wherein the second stub is linear and is perpendicular to the first segment.

7. The antenna apparatus of claim 5, wherein the first stub comprises:
- a first bent segment coupled to a first end of the first segment that is away from the connection part; and
- a second bent segment coupled to a second end of the second segment that is away from the connection part.

8. The antenna apparatus of claim 7, wherein the first bent segment, the second bent segment, and the second stub are located on same sides of the first segment and the second segment.

9. The antenna apparatus of claim 3, wherein a part of the second stub that extends into the second slot and the grounding plate on a second edge of the second slot jointly form a coplanar waveguide (CPW) feeding structure.

10. The antenna apparatus of claim 9, wherein, in the first radiation mode, electric field distribution of the CPW feeding structure is a differential mode, and wherein, in the second radiation mode, the electric field distribution is a common mode.

11. The antenna apparatus of claim 10, further comprising an insulation slot disposed on the grounding plate, wherein the first feeding component comprises:
- a first feeding point located in the insulation slot; and
- a first feeder electrically coupled between the first feeding point and the grounding plate and crossing the CPW feeding structure.

12. The antenna apparatus of claim 11, wherein the first feeding component further comprises a matching component that is grounded and electrically coupled to the first feeder, and wherein the matching component is configured to adjust a resonance point and impedance matching of the antenna apparatus in the first radiation mode.

13. The antenna apparatus of claim 11, wherein the second feeding component comprises:
- a second feeding point; and
- a second feeder electrically coupled between the second feeding point and the second stub to excite the second radiation mode.

14. The antenna apparatus of claim 3, wherein the first slot is an axisymmetric structure, and wherein a symmetric central axis of the first slot is located on a center line of the second slot that is in the second direction.

15. The antenna apparatus of claim 14, wherein the first slot comprises:
- a first end; and
- a second end opposite to the first end,
- wherein the first end extends to the second end in the first direction,
- wherein the antenna apparatus is configured for a quarter-wave mode of radiation from the first end to a first position of the second slot,
- wherein the antenna apparatus is further configured for the quarter-wave mode of radiation from the second slot to a second position of the second end,
- wherein a first electric field at the first end and a second electric field at the second end are zero, and wherein an electric field value at the first position is a largest electric field value.

16. The antenna apparatus of claim 1, wherein the monopole and the grounding plate are coplanar.

17. A mobile terminal comprising:

a display screen;

a rear cover;

a side frame coupled to and between the display screen and the rear cover;

a mainboard comprising an edge is disposed near the side frame; and an antenna apparatus located between the mainboard and the side frame, wherein the antenna apparatus comprises:

a grounding plate comprising a first edge, wherein the grounding plate is configured to radiate in a first radiation mode and in a second radiation mode, and wherein a first polarization direction in the first radiation mode is orthogonal to a second polarization direction in the second radiation mode;

a slot disposed on the grounding plate and comprising:

a first slot configured to radiate in the first radiation mode; and a second slot configured to penetrate the first slot and to extend from the first slot to the first edge;

a monopole comprising:

a first stub; and a second stub configured to:

extend from the first stub to the second slot; and radiate in the second radiation mode, wherein the second stub and the second slot form a feeding structure;

a first feeding component electrically coupled to the grounding plate and configured to feed the feeding structure to excite the first radiation mode; and a second feeding component electrically coupled to the second stub and configured to feed the feeding structure to excite the second radiation mode.

18. The mobile terminal of claim 17, wherein the antenna apparatus further comprises a connection part that is an intersection between the second stub and the first stub and comprises two sides, and wherein the first stub comprises a first segment and a second segment symmetrically disposed on the two sides.

19. The mobile terminal of claim 18, wherein both the first segment and the second segment are linear and collinear.

20. The mobile terminal of claim 19, wherein the second stub is linear and is perpendicular to the first segment.

* * * * *